(12) United States Patent
Chambers et al.

(10) Patent No.: US 6,178,478 B1
(45) Date of Patent: Jan. 23, 2001

(54) SMART TARGET MECHANISM FOR ELIMINATING DUAL ADDRESS CYCLES IN A PERIPHERAL COMPONENT INTERCONNECT ENVIRONMENT

(75) Inventors: Peter Chambers, Phoenix; Subramanian S. Meiyappan; Swaroop Adusumilli, both of Tempe, all of AZ (US)

(73) Assignee: VLSI Technology, Inc., San Jose, CA (US)

( * ) Notice: Under 35 U.S.C. 154(b), the term of this patent shall be extended for 0 days.

(21) Appl. No.: 09/210,103

(22) Filed: Dec. 11, 1998

(51) Int. Cl.⁷ .................................................... G06F 13/00
(52) U.S. Cl. ........................... 710/129; 710/127; 710/128
(58) Field of Search ..................................... 710/129, 127, 710/126, 128, 3, 4, 9, 26

(56) References Cited

U.S. PATENT DOCUMENTS

| | | | |
|---|---|---|---|
| 5,430,847 | * 7/1995 | Bradley et al. | 710/130 |
| 5,778,199 | * 7/1998 | Wanner et al. | 710/107 |
| 6,018,810 | * 1/2000 | Olarig | 714/43 |
| 6,047,120 | * 4/2000 | Bell | 395/500.48 |

* cited by examiner

*Primary Examiner*—Ario Etienne
(74) *Attorney, Agent, or Firm*—Wagner, Murabito & Hao LLP

(57) ABSTRACT

A system and method for preventing address aliasing when using a single address cycle to transmit a target address in a computer system that includes target devices having addresses of different ranges. The computer system comprises a bus, an initiator device coupled to the bus, a first target device coupled to the bus, and a second target device coupled to the bus. The first target device has a first address range comprising a plurality of bits, and the second target device has a second address range comprising a fewer number of bits than the first address range. The initiator device transmits a signal indicating the size of the target address and also separately transmits in a single address cycle the target address. The second target device disables its address decode logic in response to the signal from the initiator device provided that the size of the target address is greater than the second address range. The second target device is thus prevented from responding to the target address, thereby preventing address aliasing.

19 Claims, 7 Drawing Sheets

SMART TARGET MECHANISM FOR ELIMINATING DUAL ADDRESS CYCLES IN A PERIPHERAL COMPONENT INTERCONNECT ENVIRONMENT

TECHNICAL FIELD

The present invention pertains to the field of computer system bus architectures. More specifically, the present invention pertains to a method for optimizing address cycles in peripheral component interconnect bus systems.

BACKGROUND ART

A bus architecture of a computer system conveys much of the information and signals involved in the computer system's operation. In a typical computer system, one or more buses are used to connect a central processing unit (CPU) to a memory and to input/output devices so that data and control signals can be readily transmitted between these different components. When the computer system executes its programming, it is imperative that data and information flow as fast as possible in order to make the computer system as responsive as possible to the user. With many peripheral devices and subsystems, such as graphics adapters, full motion video adapters, small computer systems interface (SCSI) host bus adapters, and the like, it is imperative that large block data transfers be accomplished expeditiously. These applications are just some examples of peripheral devices and subsystems which benefit substantially from a very fast bus transfer rate.

Much of the computer system's functionality and usefulness to a user is derived from the functionality of the peripheral devices. For example, the speed and responsiveness of the graphics adapter is a major factor in a computer system's usefulness as an entertainment device. Or, for example, the speed with which video files can be retrieved from a hard drive and played by the graphics adapter determines the computer system's usefulness as a training aid. Hence, the rate at which data can be transferred among the various peripheral devices often determines whether the computer system is suited for a particular purpose.

The electronics industry has, over time, developed several types of bus architectures. The PCI (peripheral component interconnect) bus architecture has become one of the most widely used and widely supported bus architectures in the industry. The PCI bus was developed to provide a high speed, low latency bus architecture from which a large variety of systems could be developed.

A PCI specification is used to establish standards to facilitate uniformity and compatibility of PCI devices operating in a PCI bus architecture. Initially, the PCI specification addressed only the use of 32-bit devices and 32-bit transactions, but the specification has since been extended to 64-bit devices and transactions.

Prior Art FIG. 1 shows a simplified exemplary PCI bus architecture 100 implemented, for example, in a computer system. PCI bus 120 is coupled to PCI initiator 110. PCI bus 120 is also coupled to each of PCI target devices A 112, B 114, C 116 and D 118. PCI initiator 110 can be integrated into bus bridge 130, as shown, and bus bridge 130 in turn is used to couple PCI bus 120 to a host bus (not shown). Bus bridge 130 is typically a bidirectional bridge and is made up of numerous components; for simplicity, bus bridge 130 is shown as comprising only PCI initiator 110.

PCI bus 120 is comprised of functional signal lines, for example, interface control lines, address/data lines, error signal lines, and the like. Each of PCI target devices 112–118 are coupled to the functional signal lines comprising PCI bus 120.

With reference still to Prior Art FIG. 1, PCI targets B 114 and D 118 are 32-bit target devices. That is, PCI targets B 114 and D 118 have addresses that encompass up to 32 bits, resulting in an address range of up to four (4) gigabytes (GB) in a 32-bit memory space. Similarly, PCI targets A 112 and C 116 are 64-bit target devices, having addresses encompassing up to 64 bits, which allow an address range of up to 16 exabytes in a 64-bit memory space. In addition, PCI bus 120 is a 64-bit bus and PCI initiator 110 is a 64-bit device. Such a mix of 32-bit devices and 64-bit devices is common in today's computer systems owing to the extension of the PCI specification to 64-bit devices, and it is required that these devices function together seamlessly as well as conform to the PCI specification. Therefore, to utilize the capabilities of the computer system to their fullest extents, PCI bus architecture 100 must be capable of performing 64-bit transactions between 64-bit devices, and must also support seamless transactions between 64-bit initiator devices and 32-bit target devices.

At the time when a 64-bit initiator generates a transaction, it is not aware of the attributes of the target device; that is, it does not know whether the target is a 32-bit device or a 64-bit device. Hence, to ensure compatibility regardless of the respective ranges of the initiator and target devices, in the prior art an assumption is made that the target device is only capable of handling a 32-bit operand. Thus, the prior art technique for transmitting a 64-bit address is to represent the 64-bit address as two 32-bit operands and drive the address over the bus using dual address cycles (also known as dual address commands, DACs), one cycle to transmit each of the 32-bit operands. Because two operands are passed across the PCI bus, two PCI clock cycles are needed to complete a DAC.

With reference now to Prior Art FIG. 2, timing diagram 200 is provided exemplifying a simplified read transaction using DACs according to the prior art. For simplicity, Prior Art FIG. 2 does not illustrate all of the signals associated with a read transaction, but only shows those signals pertaining to the discussion herein. Timing diagram 200 illustrates a read transaction initiated by a 64-bit initiator device over a PCI bus capable of supporting 64-bit transactions (e.g., PCI initiator 110 and PCI bus 120 of Prior Art FIG. 1).

Continuing with reference to Prior Art FIG. 2, PCI initiator 110 starts the transaction on the rising edge of PCI clock cycle 1 by asserting the FRAME# and REQ64# signals (at points 245 and 250, respectively). Generally, FRAME# is used to indicate the start of a transaction, and REQ64# to indicate that the transaction includes a 64-bit data transfer. These signals are known in the art and are as defined in the PCI specification.

In clock cycle 1, PCI initiator 110 also drives the lower portion of the address (e.g., low address 210) onto AD[31:0] and the upper portion of the address (e.g., high address 220) onto AD[63:32], and it continues to drive high address 220 onto AD[63:32] for the duration of both address phases of the DAC. During clock cycle 2, PCI initiator 110 starts the second address phase of the DAC by driving high address 215 onto AD[31:0]. All devices on the PCI bus latch onto these addresses, and during clock cycle 3 they decode the address. The target named by the address claims the transaction in clock cycle 3 by asserting the DEVSEL# signal (at point 240). On the rising edge of clock cycle 4, for a read transaction turn-around cycles 225 are inserted in AD[31:01]

and AD[63:32]. Data A 230 and data B 232 are then driven onto the bus by the target device or by the initiator device depending on the type of transaction. Thus, in the prior art a 64-bit address is divided into two 32-bit addresses and transmitted via a DAC, even if the target device is a 64-bit device and therefore capable of reading a 64-bit address.

The prior art is problematic because a single address cycle (or single address command, SAC) cannot be used to transmit a 64-bit address as a single 64-bit operand to a 64-bit target device in the presence of a 32-bit target device, even if the 64-bit initiator knows that the target device is a 64-bit device. In accordance with the PCI specification, when an initiator device initiates a transaction, it drives onto the PCI bus the address of the target device with which the initiator device is seeking to perform the transaction. At this stage of the transaction, all target devices on the PCI bus latch onto the address, and then each target device decodes the address to determine whether or not it is the intended target named by the address. Hence, if a 64-bit address is transmitted over the PCI bus in a single address cycle, each 32-bit target device on the bus, as well as each 64-bit target device, latches onto the address. However, the 32-bit targets will only be capable of reading a portion of the address (namely, the lower 32 bits of the address), because these devices do not have access to the upper 32 bits of the address. In the likely case in which the lower half of a 64-bit address matches the 32-bit address of a 32-bit device, that 32-bit device will erroneously assert a claim to the transaction. In the meantime, the 64-bit device that is the intended recipient of the address will also assert a claim to the transaction after it decodes and recognizes its address, so that two devices will have asserted a claim to the same transaction.

Consider as an example a 32-bit target that is mapped into address 0000 0000h to 0000 FFFFh in a 32-bit memory space. A 64-bit initiator then specifies an address of 0000 0001 0000 1000h for a 64-bit target mapped into a 64-bit memory space. The 32-bit target latches onto the address but is only capable of reading the latter portion of the address, specifically the portion 0000 1000h, which, from the perspective of the 32-bit target, appears to fall within the range of addresses into which the 32-bit target device is mapped. Hence, the 32-bit target responds, as does the 64-bit target. This type of error is known as address aliasing. Address aliasing causes other types of errors to occur, such as incorrect data being sent, bus contention due to multiple and simultaneous drivers, and the like. Thus, the prior art is problematic because it does not allow a SAC to be used for a 64-bit address intended for a 64-bit target device because of address aliasing. In the prior art, if a SAC is used for a 64-bit address, then address aliasing will cause a 32-bit target to respond in error.

As can be seen from Prior Art FIG. 2, two clock cycles are needed to transmit a 64-bit address to allow a 32-bit target to read both phases of the address on AD[31:0] (a 32-bit target does not have access to AD[63:32]). Thus, another disadvantage to the prior art is that two clock cycles are used to transmit a 64-bit address when, for the case in which the intended recipient is a 64-bit target device, one clock cycle would be satisfactory. Therefore, in the prior art, data transfer subsequent to the address phase is delayed by one clock cycle. In addition, during the transaction, the PCI initiator requires ownership of the PCI bus, and thus the PCI bus is not available for other transactions. Thus, in the prior art, other transactions are also delayed because a portion of the computer system's data transfer bandwidth is consumed by the unnecessary clock cycle. This disadvantage is especially significant when multiplied by the number of transactions that occur on the PCI bus.

Accordingly, what is needed is a method and/or system which optimally utilizes the data transfer bandwidth of a computer system by eliminating DACs and hence the unnecessary expenditure of clock cycles associated with DACs. What is also needed is a method and/or system that addresses the above need and does not cause address aliasing and errors associated with address aliasing when SACs are used. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides a system and method which optimally utilize the data transfer bandwidth of a computer system by eliminating the unnecessary expenditure of clock cycles associated with DACs. The present invention also provides a system and method that address the above need and do not cause address aliasing and other errors associated with address aliasing when a SAC is used.

The present invention is a system and method for preventing address aliasing when using a single address cycle (SAC) to transmit a target address in a computer system that includes target devices having addresses of different sizes. The computer system comprises a bus, an initiator device coupled to the bus, a first target device coupled to the bus, and a second target device coupled to the bus. The first target device has a first address range comprising a plurality of bits, and the second target device has a second address range comprising a fewer number of bits than the first address range. The initiator device initiates a transaction by transmitting a signal that provides an indication of the size of the target address. The initiator also transmits in a SAC the target address. The second target device disables its address decode logic in response to the signal from the initiator device that preceded the target address provided that the size of the target address is greater than the size of the second address range. The second target device is thus prevented from responding to the target address, thereby preventing address aliasing.

In one peripheral component interconnect (PCI) compliant embodiment, the bus, the initiator device, the first target device and the second target device are PCI devices. The first target device is a 64-bit device with a 64-bit address range, and the second target device is a 32-bit device with a 32-bit address range. Additionally, the second target device disables its address decode logic in response to a REQ64# signal from the initiator device.

Thus, in accordance with the present invention, a transaction from a 64-bit initiator to a 64-bit target is accomplished with a SAC that specifies the target's 64-bit address, without causing address aliasing when a 32-bit target is present. A transaction from either a 64-bit initiator or a 32-bit initiator to a 32-bit target is also accomplished with a SAC by specifying the target's 32-bit address.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
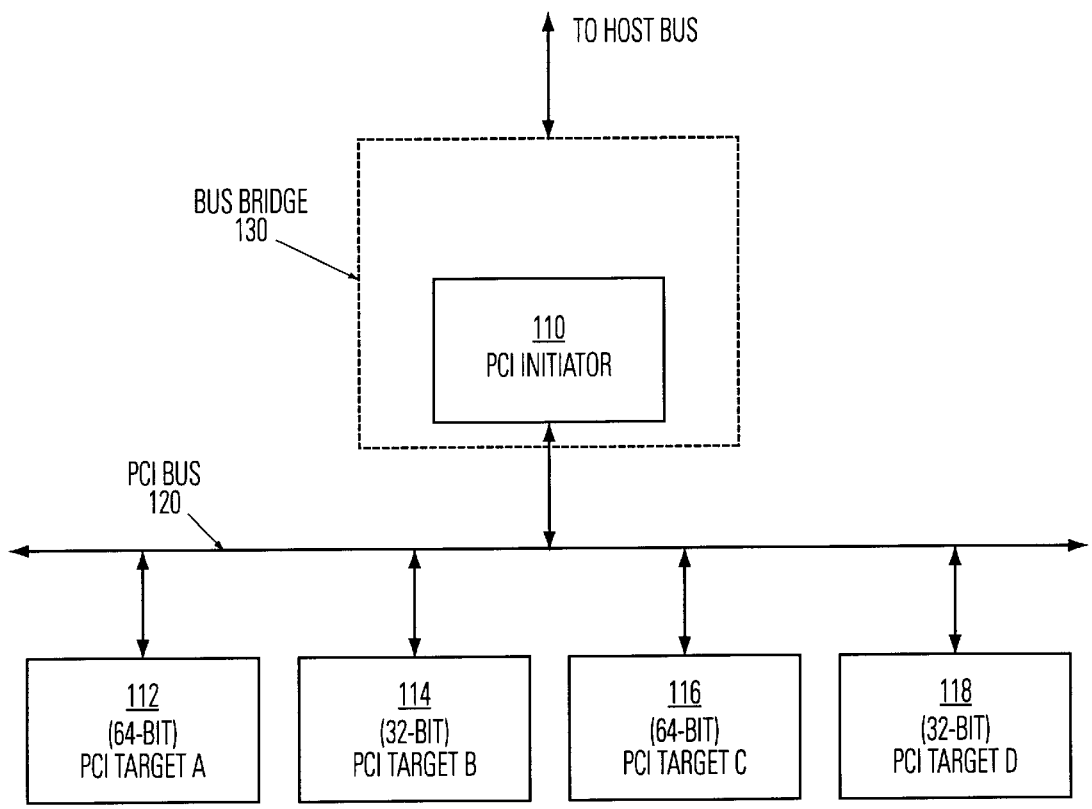
FIG. 1 is a block diagram of a simplified exemplary peripheral component interconnect (PCI) bus architecture of the prior art.
Figure 2:
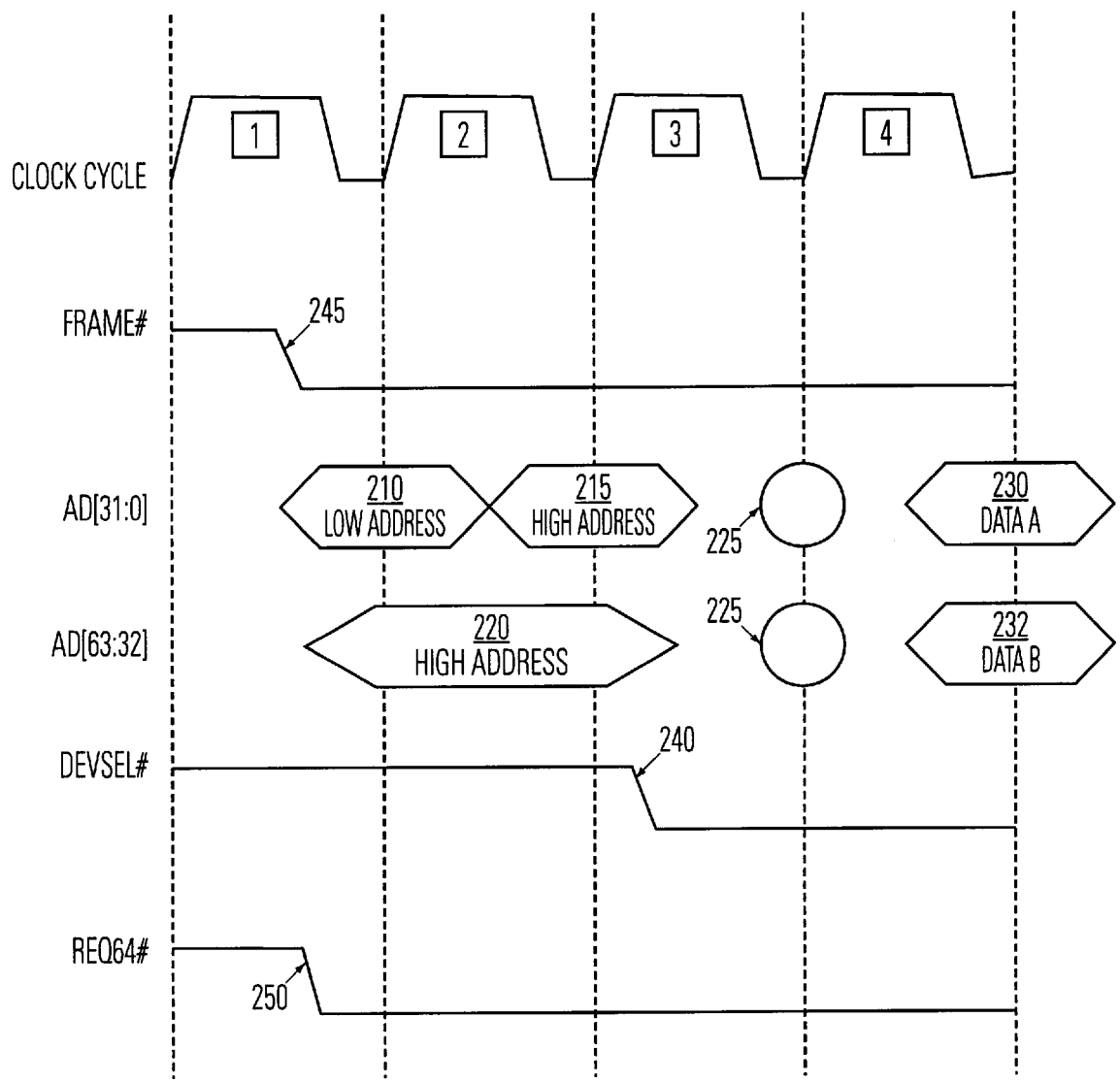
FIG. 2 illustrates a timing diagram showing the address phases of a 64-bit read transaction in accordance with the prior art.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

The present invention is a system and method that prevent address aliasing when an initiator device uses a single address cycle (SAC) to transmit a target address over a bus to target devices having addresses of different sizes. Thus, the present invention provides a system and method which optimally utilize the data transfer bandwidth of a computer system by eliminating the unnecessary expenditure of clock cycles associated with dual address cycles (DACs).

In the discussion of the embodiments which follow, the initiator device, target devices and bus are peripheral component interconnect (PCI) compliant devices. As such, the following discussions are provided in the context of a PCI-compliant bus system. However, it is understood that other configurations of a bus system may be used in accordance with the present invention such as, for example, Micro Channel, EISA (Extended Industry Standard Architecture), and the like.

Figure 3:
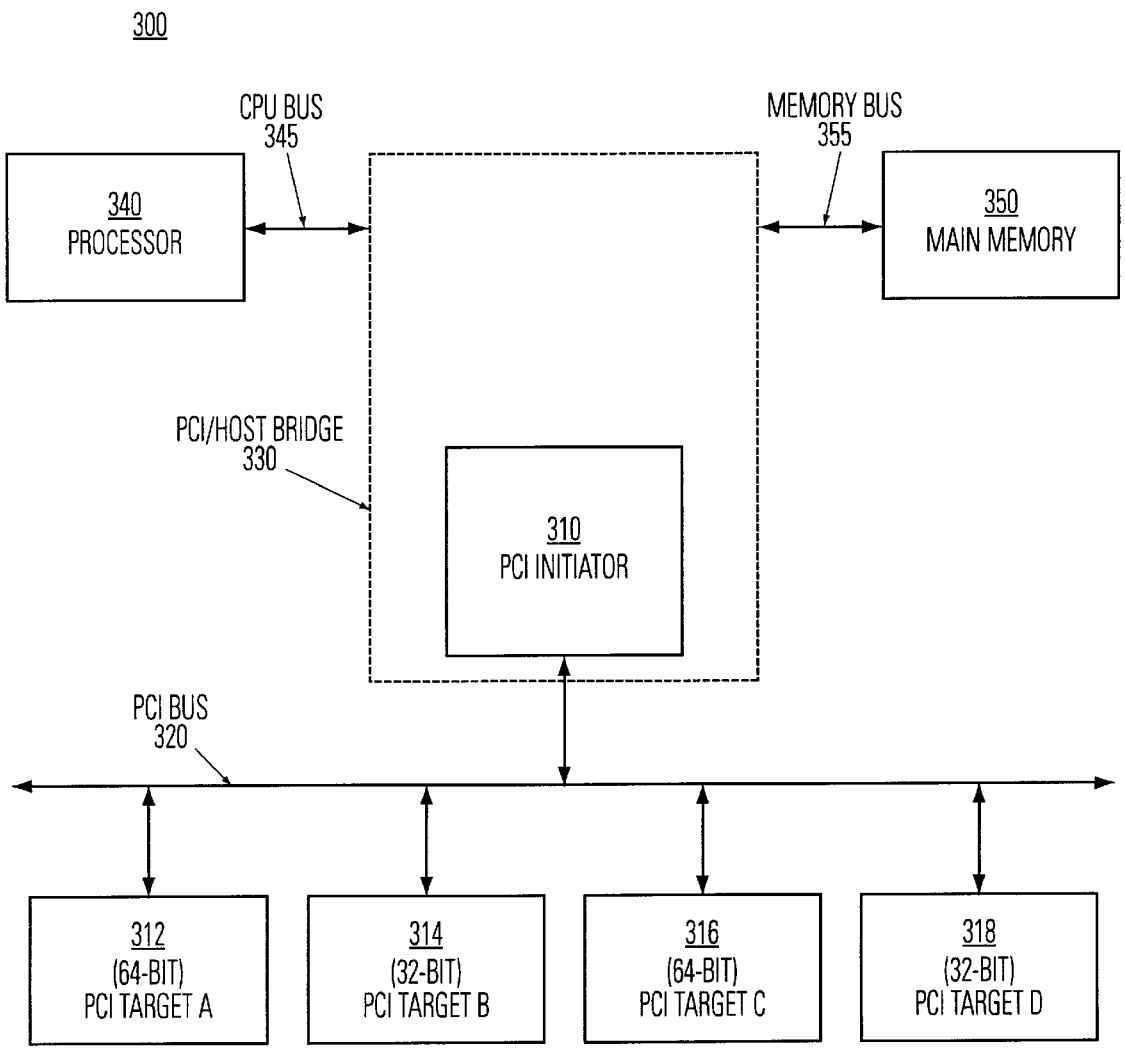
FIG. 3 is a block diagram of an exemplary PCI bus architecture implemented in a computer system in accordance with one embodiment of the present invention.

Refer now to FIG. 3, which shows an exemplary PCI bus system implemented in computer system 300 in accordance with a PCI-compliant embodiment of the present invention. The PCI bus system of computer system 300 includes PCI bus 320 coupled to PCI initiator 310. In the present embodiment, PCI initiator 310 is integrated into PCI/host bridge 330. PCI/host bridge 330 is a bidirectional PCI bridge (for simplicity, the elements of a bi-directional bridge other than PCI initiator 310 are not shown). PCI/host bridge 330 is used to couple PCI bus 320 to processor 340 via central processing unit (CPU) bus 345 and to main memory 350 via memory bus 355.

PCI bus 320 is also coupled to each of 64-bit PCI target A 312 and PCI target C 316. PCI target A 312 and PCI target C 316 have addresses that encompass up to 64 bits; that is, a 64-bit address refers to an address up to 64 bits in size. Commonly, 64-bit addresses include addresses less than 64 bits in size.

PCI bus 320 is also coupled to each of 32-bit PCI smart target B 314 and PCI smart target D 318. PCI smart target B 314 and PCI smart target D 318 have addresses that encompass up to 32 bits in size. In accordance with the present invention, PCI smart target B 314 and PCI smart target D 318 are adapted to disable their address decode logic under certain conditions in response to a signal from P0S initiator 310, as will be explained in detail below.

Figure 4:
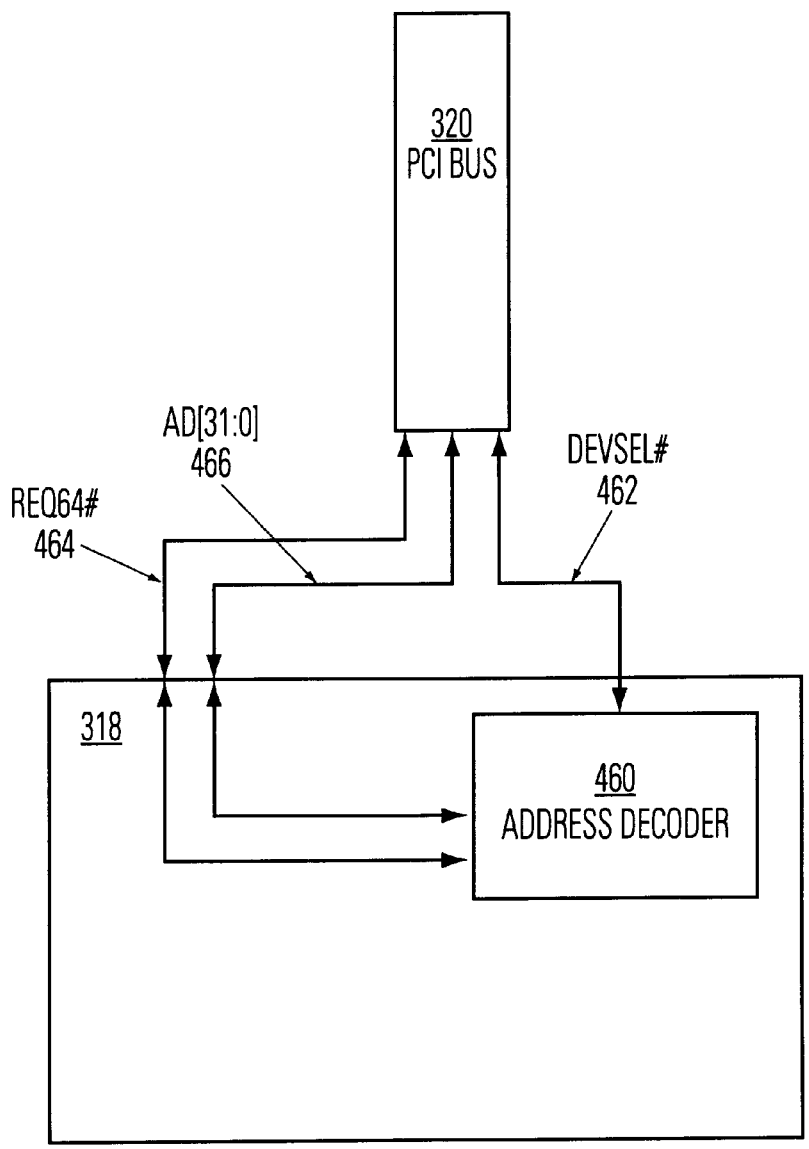
FIG. 4 is a block diagram of an exemplary smart target mechanism in accordance with one embodiment of the present invention.

With reference now to FIG. 4, PCI smart target D 318 (hereinafter, PCI target 318) is illustrated in accordance with the present embodiment of the present invention. In the present embodiment, PCI target 318 incorporates address decoder 460. Address decoder 460 is a mechanism known in the art for determining whether an address transmitted from a PCI initiator (e.g., PCI initiator 310 of FIG. 3) is within the range of addresses assigned to PCI target 318.

In the present embodiment, PCI target 318 receives via PCI bus 320 a REQ64# signal 464 from PCI initiator 310 if the data transaction that is to take place is a 64-bit transaction; in accordance with the present invention, this signal is not transmitted for a 32-bit data transaction. All 32 bit targets in PCI slots in a PCI bus system (e.g., PCI bus system 300 of FIG. 3) sample REQ64#.

Per the PCI specification, at the beginning of a transaction but subsequent to the REQ64# signal, PCI initiator 310 also transmits the address of the desired target device to all target devices on PCI bus 320. In the case of a 64-bit address, in accordance with the present invention, the address is transmitted over AD[63:32] and AD[31:0] in PCI bus 320; in the case of a 32-bit address, the address is transmitted over AD[31:0] only. Because PCI target 318 is a 32-bit target, it receives the target address specified by PCI initiator 310 via AD[31:0] 466.

Referring still to FIG. 4, in accordance with the present invention, when REQ64# signal 464 is received by PCI target 318, indicating a 64-bit data transaction will be occurring, then address decoder 460 is disabled by PCI target 318. Hence, for a 64-bit data transaction, PCI target 318 cannot decode a 64-bit address sent by PCI initiator 310 and thus cannot claim the 64-bit data transaction by asserting DEVSEL# signal 462. Thus, in accordance with the present invention, PCI bus system 300 (FIG. 3) is designed such that 32-bit targets only claim access to memory addresses below four (4) giga-bytes (GB), and 64-bit targets only claim access to memory addresses over 4 GB. In this manner, address aliasing and associated errors such as bus contention are prevented by the present invention, because a 32-bit target (e.g., PCI target 318) is not able to respond to a 64-bit address.

If REQ64# signal 464 is not received by PCI target 318, then by default this indicates that the transaction that will be occurring is a 32-bit data transaction, and address decoder 460 remains active and capable of decoding the 32-bit address associated with the transaction. Provided that PCI target 318 is the target device named by the 32-bit address, then PCI target 318 responds by claiming the transaction using DEVSEL# signal 462. Thus, the present invention allows 32-bit devices and 64-bit devices to function and interact in the same system.

Figure 5:
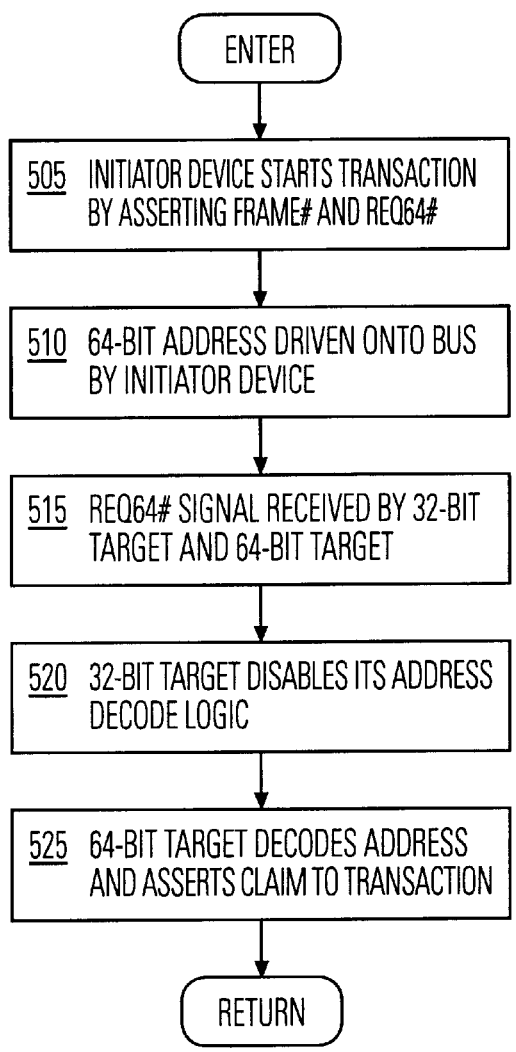
FIG. 5 is a flowchart of the process used to transmit a 64-bit address in accordance with one embodiment of the present invention.

With reference to FIG. 5 and also to FIG. 3, a flowchart of process 500 used in accordance with the present embodiment of the present invention is provided. Process 500 allows a 64-bit PCI initiator (e.g., PCI initiator 310) to transmit a 64-bit address in a single address cycle (SAC) over a PCI bus (e.g., PCI bus 320) in a PCI bus system comprising both 32-bit devices and 64-bit devices (e.g., the PCI bus system of computer system 300). Process 500 is devised such that address aliasing will not occur. Process 500 also eliminates the additional clock cycles associated with DACs.

In step 505, the 64-bit data transaction is initiated when PCI initiator 310 asserts FRAME# and REQ64# per the PCI specification. These signals are received by all of the PCI targets on PCI bus 320. The REQ64# signal indicates that the transaction is a 64-bit data transaction. This signal is not asserted for a 32-bit data transaction.

In step 510, PCI initiator 310 drives onto PCI bus 320 the 64-bit address specified for this transaction. The address is transmitted to all PCI targets on PCI bus 320. In accordance with the present invention, a SAC is used to transmit the 64-bit address. In the present embodiment, the 64-bit address is divided into two 32-bit operands and transmitted via AD[31:0] and AD[63:32]; however, the operands are transmitted during the same PCI clock cycle. In this manner, the present invention eliminates the unnecessary clock cycle associated with a DAC.

In step 515, the REQ64# signal is received by all PCI targets on PCI bus 320 (e.g., 64-bit PCI target A 312 and C 316, and 32-bit PCI smart target B 314 and D 318).

In step 520, as explained in conjunction with FIG. 4, in the present embodiment, each 32-bit PCI smart target is adapted to disable its address decoder upon receipt of the REQ64# signal. Thus, with the address decoder disabled, each 32-bit smart target is not able to decode the address received from PCI initiator 310. Therefore, in accordance with the present invention, the 32-bit smart targets are not able to assert a claim for the transaction. In this manner, the present invention prevents address aliasing and associated errors such as bus contention from occurring.

In step 525, as a consequence of step 520, in accordance with the present invention, only 64-bit targets are capable of decoding the address that was transmitted in step 510. The 64-bit target that is the target specified by the address recognizes the address as its own, and per the PCI specification asserts a claim to the transaction using DEVSEL#. From this point, the data transaction continues to proceed in accordance with the PCI specification.

Figure 6:
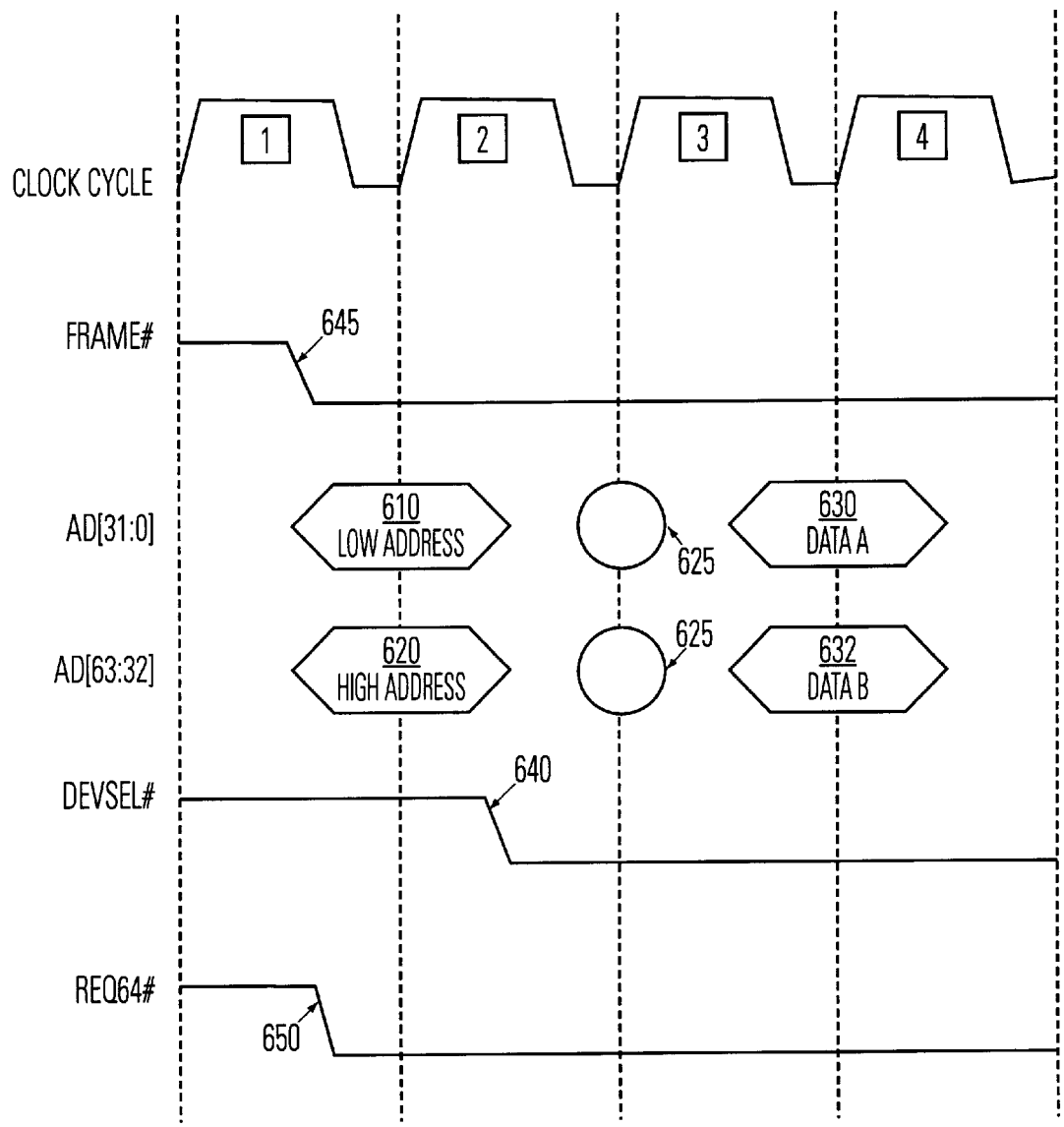
FIG. 6 illustrates a timing diagram showing the response of a 64-bit target to a 64-bit address in accordance with one embodiment of the present invention.

FIG. 6 is an illustration of timing diagram 600 exemplifying a 64-bit data transaction between a 64-bit initiator device (e.g., PCI initiator 310 of FIG. 3) and a 64-bit target (e.g., PCI target A 312 of FIG. 3) in accordance with the present invention. For simplicity, FIG. 6 does not include all of the signals associated with a data transaction, but only shows those signals pertaining to the discussion herein.

PCI initiator 310 starts the transaction on the rising edge of PCI clock cycle 1 by asserting the FRAME# and REQ64# signals at points 645 and 650, respectively. Also in clock cycle 1, in accordance with the present invention, PCI initiator 310 drives the lower portion of the address (e.g., low address 610) and the upper portion of the address (e.g., high address 620) onto PCI bus 320 (FIG. 3) over AD[31:0] and AD[63:32], respectively. PCI target A 312 receives both portions of the address and decodes the address in clock cycle 2. Recognizing the address as its address, PCI target A 312 claims the transaction by asserting DEVSEL# in clock cycle 2 at point 640. Turn-around cycles 625 are inserted during clock cycle 3, and data A 630 and B 632 are then driven onto PCI bus 320 by either PCI initiator 310 or PCI target A 312, depending on the type of data transaction (e.g., a read transaction or a write transaction). Thus, as shown by FIG. 6, the present invention allows completion of the address cycle and the transfer of data to occur one clock cycle sooner than possible when DACs are used to transmit a 64-bit address. The present invention thus optimally utilizes the data transfer bandwidth of a computer system and also saves power in power-critical devices that are powered by batteries, such as lap-top computers.

Figure 7:
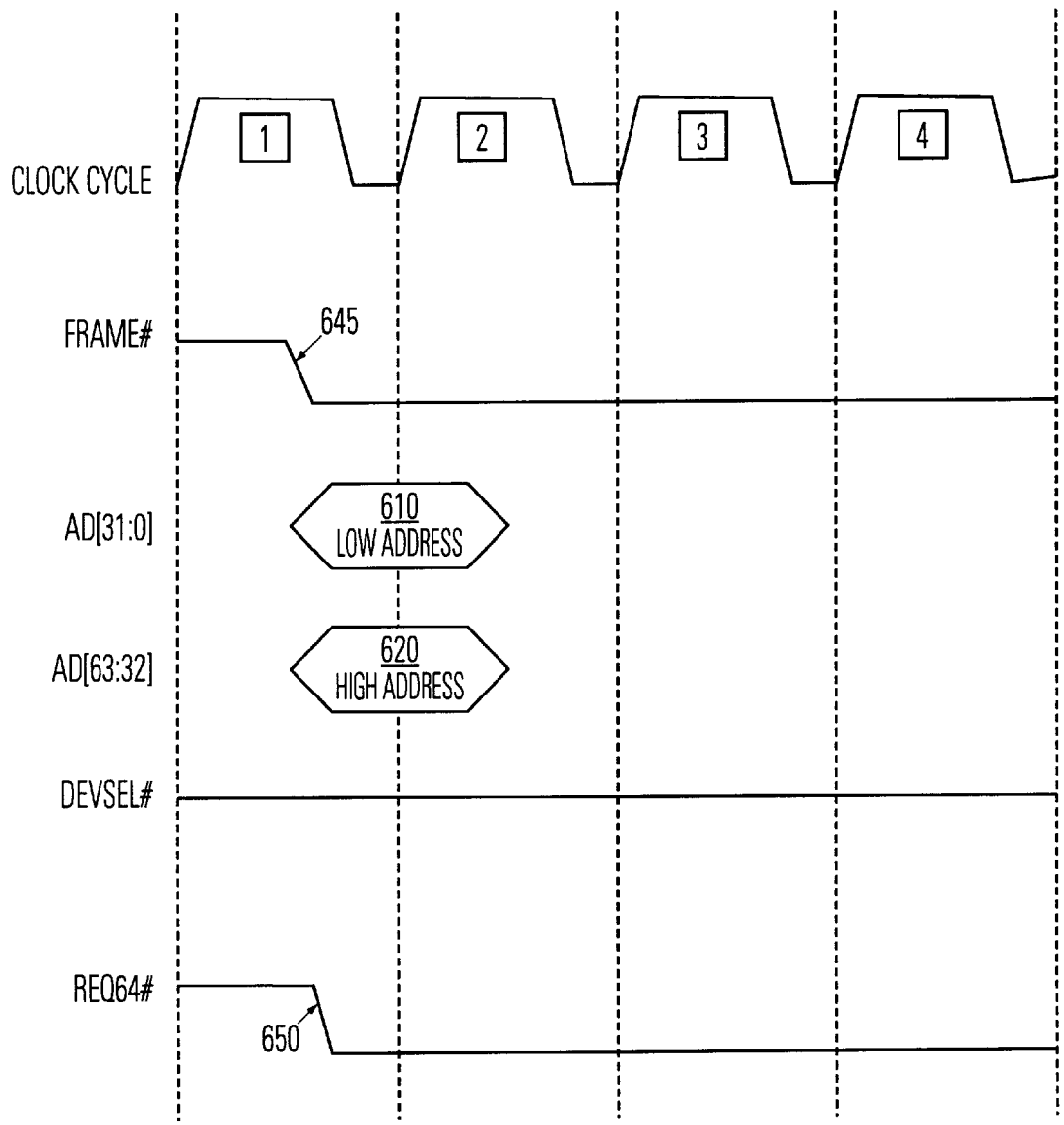
FIG. 7 illustrates a timing diagram showing the response of a 32-bit target to a 64-bit address in accordance with one embodiment of the present invention.

FIG. 7 is an illustration of timing diagram 700 exemplifying a 64-bit data transaction between a 64-bit initiator device (e.g., PCI initiator 310 of FIG. 3) and a 32-bit smart target (e.g., PCI smart target D 318 of FIG. 3) in accordance with the present invention. For simplicity, FIG. 7 does not include all of the signals associated with a data transaction, but only shows those signals pertaining to the discussion herein.

In the same manner as that described above in conjunction with FIG. 6, PCI initiator 310 starts the transaction on the rising edge of PCI clock cycle 1 by asserting the FRAME# and REQ64# signals at points 645 and 650, respectively. Also in clock cycle 1, in accordance with the present invention, PCI initiator 310 drives the lower portion of the address (e.g., low address 610) and the upper portion of the address (e.g., high address 620) onto PCI bus 320 (FIG. 3) over AD[31:0] and AD[63:32], respectively. PCI smart target D 318 receives the REQ64# signal, and in accordance with the present invention, disables its address decoder. Consequently, when PCI smart target D 318 receives only low address 610 over AD[31:0], it is not able to decode the address (as a 32-bit target, PCI smart target D 318 does not have access to AD[63:321]. Consequently, PCI smart target D 318 does not assert DEVSEL# to claim the transaction. Thus, as shown by FIG. 7, the present invention allows a 64-bit address to be transmitted using a SAC in a system comprising both 64-bit and 32-bit targets; however, in accordance with the present invention, the 32-bit targets do not respond to the address, thereby precluding the occurrence of address aliasing, bus contention, and the like.

Note that the present invention continues to permit a 64-bit initiator to perform a data transaction with a 32-bit target using SACs. In this case, the 64-bit initiator transmits the 32-bit address in a SAC and does not assert REQ64#. Hence, the address decoder of the 32-bit target remains active and decodes the address. The present invention thus permits 64-bit devices and 32-bit devices to function together seamlessly while permitting the use of a SAC for all 64-bit and 32-bit addresses.

The present invention thus provides a system and method that prevent address aliasing when using a SAC to transmit a target address in a computer system comprising target devices having addresses of different sizes. The present invention optimally utilizes the data transfer bandwidth of a computer system by eliminating the unnecessary expenditure of clock cycles associated with DACs. The present invention also provides a method and system that do not cause address aliasing and other errors associated with address aliasing. Furthermore, by eliminating the unnecessary expenditure of clock cycles and by disabling the address decoder of a PCI smart target in accordance with the present invention, the present invention saves power in power-critical devices such as lap-top computers.

The preferred embodiment of the present invention, eliminating dual address cycles to increase PCI bandwidth, is thus described. While the present invention has been described in particular embodiments, it should be appreciated that the present invention should not be construed as limited by such embodiments, but rather construed according to the following claims.

What is claimed is:

1. A computer system comprising:
a bus;
an initiator device coupled to said bus;
a first target device coupled to said bus, wherein said first target device has a first address range comprising a plurality of bits; and
a second target device coupled to said bus, wherein said second target device has a second address range, wherein said second address range comprises a fewer number of bits than said first address range;
said initiator device adapted to transmit a target address in a single address cycle to said first target device and to said second target device, said initiator device further adapted to transmit a signal indicating a size of said target address; and
said second target device adapted to not respond to said target address received from said initiator device when said signal indicates that said size of said target address is greater than said second address range, thereby preventing address aliasing.

2. The computer system of claim 1 wherein said second target device is adapted to disable its address decode logic in response to said signal from said initiator device when said signal indicates that said size of said target address is greater than said second address range.

3. The computer system of claim 1 wherein said first target device is a 64-bit device, said first address is a 64-bit address, said second target device is a 32-bit device, and said second address is a 32-bit address.

4. The computer system of claim 3 wherein said signal from said initiator device is a signal indicating said 64-bit address will be used.

5. The computer system of claim 1 wherein said bus, said initiator device, said first target device and said second target device are peripheral component interconnect (PCI) compliant devices.

6. The computer system of claim 5 wherein said signal and said address decode logic comply with a PCI standard specification.

7. The computer system of claim 6 wherein said signal is a REQ64# signal and said address decode logic is associated with a DEVSEL# signal.

8. A method for using a single address cycle to transmit a 64-bit address in a computer system comprising a 64-bit target device and a 32-bit target device, said method comprising the steps of:
a) an initiator device of said system generating a signal indicating said 64-bit address will be used;
b) receiving said signal at said 64-bit target device and said 32-bit target device;
c) responsive to said signal, preventing said 32-bit target device from responding to said 64-bit address; and
d) said initiator device transmitting said 64-bit address to said 64-bit target device and to said 32-bit target device in said single address cycle.

9. The method of claim 8 wherein said step c further comprises disabling address decode logic used by said 32-bit target device for reading an address from said initiator device.

10. The method of claim 8 further comprising the step of:
e) said 64-bit target device decoding said 64-bit address and asserting a claim to said 64-bit address.

11. The method of claim 8 wherein said 64-bit target device, said 32-bit target device, and said initiator device are peripheral component interconnect (PCI) compliant devices.

12. The method of claim 8 wherein said signal is generated only for said 64-bit address.

13. The method of claim 8 wherein said signal and said address decode logic comply with a PCI standard specification.

14. The method of claim 13 wherein said signal is a REQ64# signal and said address decode logic is associated with a DEVSEL# signal.

15. In a computer system comprising an initiator device, a 64-bit target device, and a 32-bit target device, a method for said initiator device to transmit in a single address cycle a 64-bit address, said method comprising the steps of:
a) receiving, at said 32-bit target device, a signal from said initiator device, said signal indicating said 64-bit address will be used;

b) responsive to said signal, preventing said 32-bit target device from responding to said 64-bit address by disabling address decode logic used by said 32-bit target device for reading an address from said initiator device; and c) said initiator device transmitting said 64-bit address to said 64-bit target device and to said 32-bit target device in said single address cycle.

16. The method of claim 15 wherein said initiator device, said 64-bit target device, and said 32-bit target device are peripheral component interconnect (PCI) compliant devices.

17. The method of claim 15 wherein said signal is generated only for said 64-bit address.

18. The method of claim 15 wherein said signal and said address decode logic comply with a PCI standard specification.

19. The method of claim 18 wherein said signal is a REQ64# signal and said address decode logic is associated with a DEVSEL# signal.

* * * * *